Aug. 10, 1971 K. O. BECK ET AL 3,598,523

METHOD OF PRODUCING CADMIUM ORTHO-GERMANATE

Filed Jan. 11, 1968

INVENTORS.
KENNETH O. BECK
SHOU-LING HOU

BY *Gerald S. Geren*

ATTORNEY

United States Patent Office 3,598,523
Patented Aug. 10, 1971

3,598,523
METHOD OF PRODUCING CADMIUM ORTHO-GERMANATE

Kenneth O. Beck, Newton, Mass., and Shou-Ling Hou, Corning, N.Y., assignors to Corning Glass Works, Corning, N.Y.

Filed Jan. 11, 1968, Ser. No. 697,237
Int. Cl. G01g *17/00*
U.S. Cl. 23—51 4 Claims

ABSTRACT OF THE DISCLOSURE

This invention relates to the discovery of a method for growing photoconductive single crystals of cadmium ortho-germanate ($Cd_2GeO_4$) from a saturated solution of cadmium oxide (CdO), germanium oxide ($GeO_2$), and lead fluoride ($PbF_2$) and the use of the crystals.

BACKGROUND OF THE INVENTION

The growth of large single crystals, for use in various electronic devices, is known to be very desirable. Depending upon the type of crystal to be grown, numerous techniques have been used. Where the viscosity and/or volatility of the constituents present a problem, it has been found to be difficult to grow large single crystals using known techniques. In order to avoid the problems of volatility and viscosity, a technique has been developed as disclosed in U.S. patent application entitled "Growth of Cadmium Oxide Crystals," Ser. No. 697,235, filed concurrently herewith. Using that technique, I have discovered that I can prepare a large single crystal of cadmium ortho-germanate ($Cd_2GeO_4$). Polycrystalline cadmium ortho-germanate has been prepared by W. L. W. Ludekens, J. Inorg. Nucl. Chem. 3,281 (1956); however, no large crystals have been produced.

SUMMARY

The technique by which these crystals are grown is known as the molten salt solution technique. This technique basically comprises forming a saturated solution of cadmium oxide and germanium oxide in a molten solvent salt, cooling the saturated solution until the cadmium ortho-germanate crystals begin to grow, thereafter continuing to cool the solution to a temperature just above that at which a second phase will begin to precipitate and then drawing off the remaining liquid. After the remaining liquid is drawn off, the crystals of cadmium ortho-germanate will be found adhering to the crucible. The primary advantages of this method are: that the crystals can be formed at a low enough temperature so that volatilization of the cadmium oxide is not a problem and so that the viscosity of the germanium oxide is not a problem.

We have found that the cadmium ortho-germanate crystals which have been grown by this technique are both semiconductive and photoconductive; upon exposure of a crystal of this material to radiation an electric current can be produced. Other materials which exhibit photoconductivity are cadmium sulfide (CdS), cadmium telluride (CdTe), and cadmium selenide (CdSe). The peak photosensitivity of cadmium ortho-germanate compares favorably with cadmium sulfide; however, cadmium ortho-germanate is far more responsive.

After the discovery that cadmium ortho-germanate crystals could be prepared by the molten salt solution technique, several crystals were prepared by the direct heating method. In this method, cadmium oxide and germanium oxide were heated together so as to form a crystal of pure cadmium ortho-germanate. The crystal thus formed was found to be an insulator and not photoconductive, thus indicating some unique property of the process renders the crystal photoconductive.

DESCRIPTION OF THE PREFERRED EMBODIMENT

Figure 1:
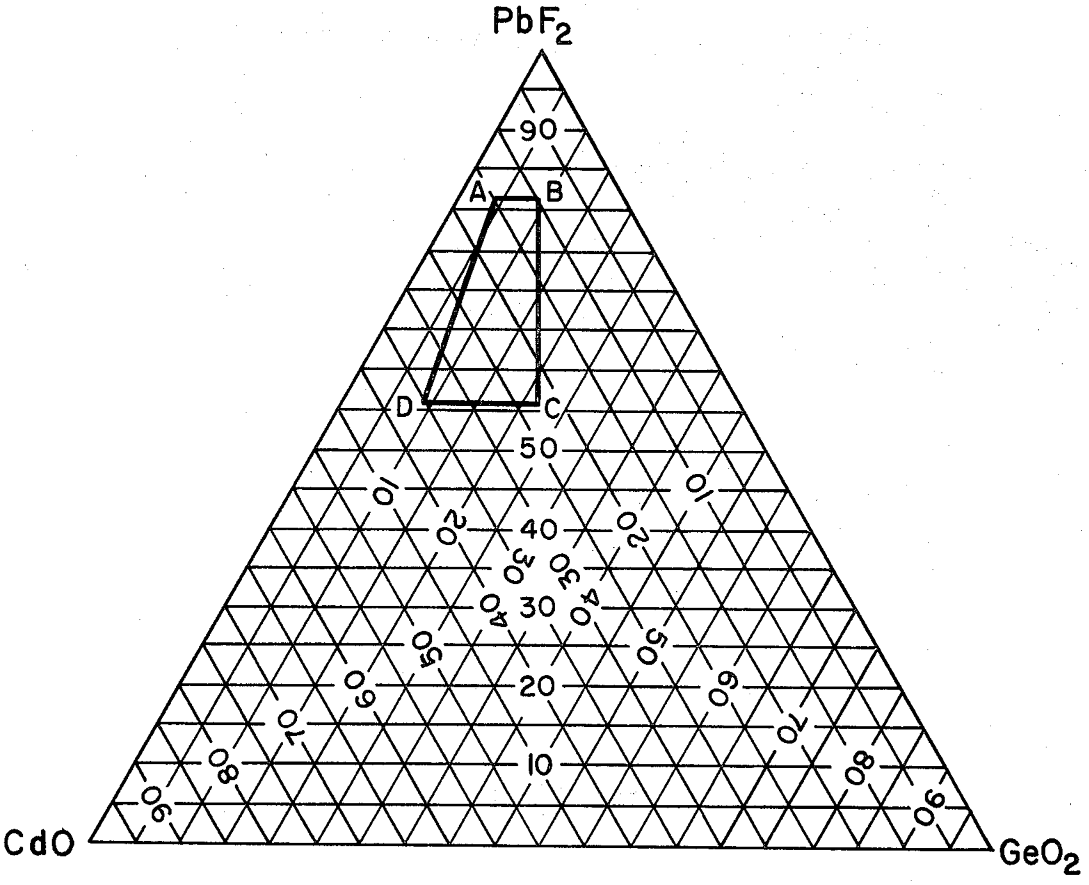
FIG. 1 is a triaxial composition diagram indicating the composition range in which cadmium ortho-germanate crystals can be grown.

The preferred molten salt solvent, or flux, has been found to be lead fluoride. Therefore, the system which will produce cadmium ortho-germaniate crystals is the cadmium oxide-lead fluoride-germanium oxide system. In general, it is preferable to grow the crystals in the middle composition ranges. If the compositions are high in cadmium oxide, there will be problems resulting from the high melting point of the cadmium oxide and the volatilization thereof. Solutions which are very rich in lead fluoride again are not preferred because the lead fluoride crystallizes from these solutions. Solutions high in germanium oxide were not studied because of the problems of volatility and improbability of producing cadmium ortho-germanate. Cadmium ortho-germanate can be grown in the region defined by A—B—C—D in FIG. 1. Line A—D represents various compositions wherein the CdO to $GeO_2$ mole ratio is 4:1 and is dissolved in a sufficient amount of $PbF_2$ to make a saturated solution at the liquidus temperature. Line B—C represents various compositions wherein the CdO to $GeO_2$ mole ratio is 1:1 and is dissolved in a sufficient amount of $PbF_2$ to form a saturated solution at the liquidus temperature. For any ratio between 1:1 and 4:1 the mole percent of $PbF_2$ is defined by lines A—B and C—D. Line A—B represents about 82 mole percent $PbF_2$ and if this amount is exceeded, $PbF_2$ crystals will precipitate. Line C—D represents about 56 mole percent $PbF_2$ below which saturated solutions of CdO and $GeO_2$ in $PbF_2$ will not form. Therefore, points A—B—C—D define the practical solution composition limits from which cadmium ortho-germanate crystals can be grown. Most of the volatilization losses occur at temperatures greater than about 900° C. Therefore, in general, the preferred system is a lead fluoride-cadmium oxide-germanium oxide system defined by the points A—B—C—D and which will form saturated solutions at temperatures less than about 900° C. Temperatures higher than about 900° C. can be used but sealed containers would be required. One of the several problems which could occur using these high temperatures and sealed containers is that the cadmium oxide may corrode the platinum crucible which is used.

The saturated solution of cadmium oxide and germanium oxide in lead fluoride is produced by heating the selected mixture of cadmium oxide, germanium oxide, and lead fluoride to a temperature greater than the liquidus temperature for that mixture. In order to maintain the composition of the solution it is, normally, not heated above the volatilization temperature, or about 900° C. Therefore, the solution temperatures can be said to be between the liquidus temperature for the selected mixture and about 900° C. The saturated solution is then allowed to cool from the solution temperature down through the liquidus temperature. As the temperature decreases below the liquidus temperature, the primary cadmium ortho-germanate phase begins to precipitate. During the next stage of cooling, the primary cadmium ortho-germanate phase continues to grow and the remaining liquid becomes depleted in cadmium oxide and germanium oxide. The solution is continuously cooled until it reaches a temperature just above which a secondary phase begins to precipitate. The remaining solution may then be drawn off thus leaving only the primary cadmium ortho-germanate crystals. The minimum temperature at which the solution may be drawn off, before the secondary phase begins to precipitate, is approximately 630° C.

This method of draining off the remaining solution is the easiest method to separate the desired crystals. If the solution were allowed to cool below the temperature at which the secondary crystals appear, there would be the problem of separating the secondary crystals from the primary crystals. Furthermore, if the solution were allowed to completely solidify, there would be the problem of separating the desired cadmium orthogermanate crystals from the solidified solution.

A broad range of solution compositions has been used. However, the only phase of cadmium germanate which could be obtained is the $Cd_2GeO_4$ phase. Solution compositions which would in theory have yielded $CdGeO_3$ or $Cd_3GeO_5$ have yielded only $Cd_2GeO_4$. However, some solutions have been prepared wherein $Cd_2GeO_4$ and CdO will coprecipitate.

Powdered high purity reactants have been used in the preparation of all melts. The particle size of the reactants has little, if any, effect on the final crystals. However, powdered, sub 300 mesh particles, were used since this increased the solution rates. The reactants are thoroughly mixed and then placed into a platinum crucible. For a crucible cover, a thin (.005 inch) platinum sheet is hand crimped over the crucible. With this procedure, volatilization losses are negligible. The crucible and its charge are then placed into a box type furnace which is capable of very accurate temperature control.

In general, the cadmium ortho-germanate crystals grow on the walls or bottom of the crucible, so that they adhere to the crucible and will remain secured to the wall after the remaining liquid is drawn off. However, if they do not remain secured, the remaining liquid could be filtered so as to prevent the cadmium ortho-germanate crystals, which are contained therein, from being solidified in the remaining liquid. As the cooling rate from the liquidus temperature down to the temperature at which the secondary phase begins to appear is decreased, the size of the cadmium ortho-germanate crystals which grow increases. Hence, there is a direct relationship between the size of the cadmium ortho-germanate crystals and the cooling rate. Cooling rates of about 1° C./hour are preferred, however, cooling rates as high as about 100° C./hour may be used.

I found that the crystal growth and shape will be greatly affected if there is temperature gradient in the crucible; that is, the crystals will begin to form at the coolest part of the crucible. If there is no gradient, the crystals will grow at a random manner in the solution itself. It is most convenient to make the side wall of the crucible the coolest portion thereof; this may be done by the suitable location of furnace heating elements. If it is so desired, the top or bottom of the crucible may be made the coolest portion thereof.

The crystals produced by this method are normally red in color and have an olivine structure. These crystals are normally about 1 inch long and ½ inch wide. The crystals thus grown have been found to be an N type semiconductor and to have a resistivity of approximately 30 ohm centimeters, containing about $2\times10^{15}$ donors per cubic centimeter, a mobility of about 80 $cm.^2$/volt second, and have an energy gap of approximately 3.8 ev.

The method for growing these crystals will be better understood from the following examples:

EXAMPLE I 328 grams of powdered lead fluoride were mixed with 67 grams of cadmium oxide and 55 grams of germanium oxide. This is equivalent to a 56 mole percent lead fluoride-22 mole percent cadmium oxide-22 mole percent germanium oxide mixture. This mixture was put in a platinum crucible which was heated to 900° C. and held there for several hours, until the mixture was completely liquid. The liquid mixture was then cooled at a rate of 1° C./hour to about 630° C. A temperature gradient was created in the crucible by proper location of the heating elements. After cooling to 630° C. the crucible was quickly removed from the furnace and the remaining liquid was poured off. After cooling to room temperature, large crystals of cadmium ortho-germanate were found adhering to the front portion of the crucible. These crystals were about 1 inch long x ½ inch wide x ½ inch thick.

EXAMPLE II 402 grams of powdered lead fluoride were mixed with 36 grams of cadmium oxide and 3 grams of germanium oxide. This is equivalent to an 82 mole percent lead fluoride-14.4 mole percent cadmium oxide-3.6 mole percent germanium oxide mixture. This mixture was put in a platinum crucible which was then heated to a temperature of 900° C. and held there for several hours, until the mixture was completely liquid. The liquid mixture was then cooled at a rate of about 1° C./hour. A temperature gradient was created in the crucible by proper location of the heating elements. After cooling to about 630° C. the crucible was quickly removed from the furnace and the remaining liquid was poured off. After cooling to room temperature, large crystals of cadmium ortho-germanate were found adhering to the front portion of the crucible. These crystals were about ¾ inch long x ⅜ inch wide x ⅜ inch thick.

EXAMPLE III 390 grams of powdered lead fluoride were mixed with 17 grams of germanium oxide and 43 grams of cadmium oxide. This is equivalent to a 76 mole percent lead fluoride-16 mole percent cadmium oxide-8 mole percent germanium oxide mixture. This mixture was put in a platinum crucible which was heated to 850° C. and held there for several hours, with the mixture being completely liquid. The liquid mixture was then cooled at a rate of 1° C./hour to about 630° C. A temperature gradient was created in the crucible by proper location of the heating elements. After cooling to 630° C. the crucible was quickly removed from the furnace and the remaining liquid was poured off. After cooling to room temperature, large crystals of cadmium ortho-germanate were found adhering to the front portion of the crucible. These crystals were about ¾ inch long x ⅜ inch wide x ⅜ inch thick.

Pure cadmium ortho-germanate has been made by the direct heaing method and found to be an insulator and non-photoconductive. Direct heating melts were next made with trace amounts of lead fluoride; crystals made with these traces of lead fluoride were found to be semiconducting and photoconductive. From these results it is believed that the fluorine ion acts as the sensitizer. However, analysis of the crystals made by the molten salt solution technique indicate that traces of boron are also present. Therefore, in addition to the fluorine ion acting as a sensitizer it is possible that the boron ion also acts as a sensitizer. Hence, it can be said that cadmium ortho-germanate crystals made by the molten salt solution technique are photoconductive probably due to the action of fluorine and perhaps boron as a sensitizer.

These crystals produce a photocurrent when exposed to radiation between about 2000 and 8000 A., which is a very broad spectral response. That range covers the entire visible spectrum and portions of the infrared and ultraviolet spectrums. The band edge of these crystals is about 3200 A. with the peak sensitivity also at about 3200 A. The peak sensitivity of this material is quite high, about $0.5\times10^{-2}$ $cm.^2$/ohm-watt, although it is about 1 to 2 orders of magnitude less than that of CdS, which is the most photosensitive material present known. The most surprising property of this material is the time in which the crystals respond to exposure and removal of existing radiation. These times are known as rise times on exposure, and decay times on removal of exposure. To our knowledge, this material has the fastest response times. The rise is about $5 \times 10^{-6}$ seconds and the decay time is about $30 \times 10^{-6}$ seconds. This discovery is surprising in view of the fact that both the rise and decay times, for CdS, are from about 1 to 10 seconds. It is immediately obvious that this response time can be utilized in many ways. Cadmium ortho-germanate grown by the molten salt solvent technique, therefore, is one of the most photosensitive materials known and has the fastest known rise and decay times.

Figure 2:
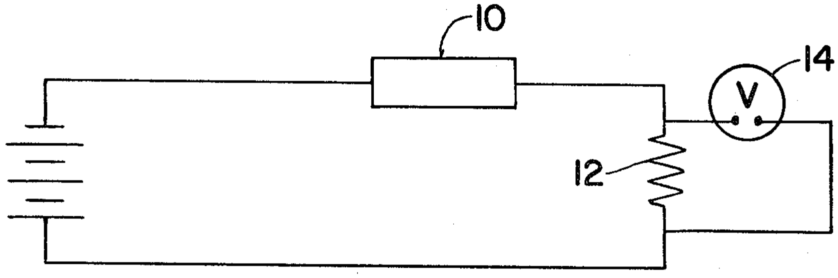
FIG. 2 is a radiation detecting electrical circuit utilizing a photoconductive structural element.

Thus, the grown crystals can be used in a circuit, for detecting radiation, as a photoconductive structural element. A typical circuit is shown in FIG. 2 wherein numeral 10 represents the structural element. Quite basically, the voltage across the resistor 12, is measured when the structural element 10 is not exposed to radiation. Upon exposure, a photocurrent is produced thus increasing the voltage across the resistor 12. This change in voltage is measured by voltmeter 14. In place of the voltmeter other voltage sensitive devices can be substituted therefor. Circuits as described can be used in light meters or other radiation detecting devices.

Electrical contact between the photoconductive structural element and the rest of the circuit can be made by using spring contacts or an indium solder.

We claim:

1. A method for growing single crystals of $Cd_2GeO_4$ comprising the steps of:

(1) melting a mixture of CdO, $GeO_2$, and $PbF_2$ having a composition defined by ABCD on the triaxial diagram of FIG. 1 of the drawing at a temperature higher than the liquidus of the mixture for a period of time sufficient to obtain essentially complete solution and reaction between said CdO and $GeO_2$;

(2) slowly cooling the solution through the liquidus temperature, causing the growth of $Cd_2GeO_4$ crystals therein, to a temperature near but above that at which a second crystal phase will precipitate; and then (3) separating the thus-formed $Cd_2GeO_4$ crystals from the solution remaining.

2. A method according to claim 1 wherein the melting temperature ranges from between about the liquidus temperature of the mixture to about 900° C.

3. A method according to claim 1 wherein the rate of cooling the solution ranges about 1°–100° C. per hour.

4. A method according to claim 1 wherein the temperature at which said second crystal phase will precipitate is about 630° C.

References Cited

UNITED STATES PATENTS

| | | | |
|---|---|---|---|
| 3,154,502 | 10/1964 | Marinace et al. | 252—301.6 |
| 3,294,701 | 12/1966 | Vogel et al. | 23—15UX |
| 3,386,799 | 6/1968 | Grodkiewicz et al. | 23—51 |

FOREIGN PATENTS

| | | | |
|---|---|---|---|
| 823,187 | 11/1959 | Great Britain | 252—501 |

WINSTON A. DOUGLAS, Primary Examiner

M. J. ANDREWS, Assistant Examiner